May 5, 1970     H. J. FRANK     3,510,741

CAPACITOR START MOTOR CIRCUIT

Filed Jan. 16, 1967

INVENTOR
HARRY J. FRANK
BY
Andrus & Starke
Attorneys

United States Patent Office 3,510,741
Patented May 5, 1970

---

3,510,741
CAPACITOR START MOTOR CIRCUIT
Harry J. Frank, Box 357C, Rte. 1,
Cedarburg, Wis. 53012
Filed Jan. 16, 1967, Ser. No. 609,657
Int. Cl. A02p 1/44
U.S. Cl. 318—221                      8 Claims

ABSTRACT OF THE DISCLOSURE

A single phase capacitor start motor includes a run winding and a parallel start winding-capacitor network. A silicon controlled rectifier is connected in series with the start winding. The gate circuit of the rectifier is connected across the resistor of a current responsive protective device commercially available under the mark "Klixon" to trigger the rectifier and automatically cut out the start winding as running speed is approached. The gate is connected to the resistor to the line side of the resistor in series with a resistor and a diode. Alternatively, a pair of voltage dividing resistors connects the gate to the line side of the resistor and a gate protective circuit includes a resistor in series with the silicon controlled rectifiers and a thermistor connected across the gate circuit. Under heavy loads, the current through the protective resistor heats the thermistor, reduces its resistance and bypasses the gate circuit to protect the silicon controlled rectifiers.

---

This invention relates to a capacitor start motor circuit and particularly to an improved means for energizing an auxiliary starting winding of such a motor during the starting thereof.

Single phase induction motors must be provided with special means to provide the starting torque. A well known circuit employs a start winding in a series circuit branch with a capacitor and a switch means connected in parallel with the run winding. A centrifugal switch in the series branch is normally closed to establish simultaneous energization of the run and start winding when power is first applied to the motor. As running speed is approached, the starting torque is no longer necessary and the centrifugal switch operates and opens the circuit to the start winding.

Current or voltage operating start relays have also been widely employed. More recently, silicon controlled rectifiers or similar triggered devices have been suggested as the switching devices in the circuit of the start winding.

The use of silicon controlled rectifiers to replace the mechanical starting switches provides the highly desirable results of simplicity, dependability, low maintenance and long life. They also have the distinct advantage that the switch structure can then be made as a small component thereby reducing the size of the motor.

The present invention is particularly directed to a highly improved gate circuit for interconnecting of the silicon controlled rectifiers or other triggered solid state devices in the start circuit.

Generally, in accordance with the present invention, the silicon controlled rectifier or similar gated devices are connected in the series circuit with the start winding. A pair of controlled rectifiers may be employed to carry the alternate half cycles with a transformer interconnecting the main circuit of the first rectifier to the gate circuit of the second. The gate circuit of the first rectifier is connected across the resistance element of a current responsive motor protective device and includes a current limiting resistance means. A diode may also be employed and has been found to provide advantageous rapid opening of the start winding circuit. Further, it has been found that particularly with higher horsepower single phase motors, a locked rotor condition can maintain current in the starting circuit which will damage or destroy solid state components such as the silicon controlled rectifiers of normal rating. In accordance with the present invention, an electrical heating element is connected in series with the starting circuit and a thermistor or other temperature responsive element is connected across the gate circuit. Under locked rotor conditions, the thermistor is heated to a level to bypass the gate circuit preventing turn-on of the silicon controlled rectifiers and thereby preventing damage to the units. It has been found that the heating element may be readily selected to permit the normal starting operation during which the rectifiers are only connected in the circuit for a short period and still rapidly respond to bypass the gate prior to damaging conditions of a greater period. A highly simple and satisfactory protective circuit employs a thermistor connected across the gate circuit with a loop of resistance wire serially inserted in the start winding circuit and looped about the thermistor.

The present invention has been found to provide a very simple, inexpensive and reliable control unit.

The drawing furnished herewith illustrates the best mode presently contemplated of carrying out the invention.

In the drawing:

FIG. 2 is a view similar to FIG. 1 showing a similar circuit including the improved gate protective circuit responsive to locked rotor conditions and the like.

Figure 1:
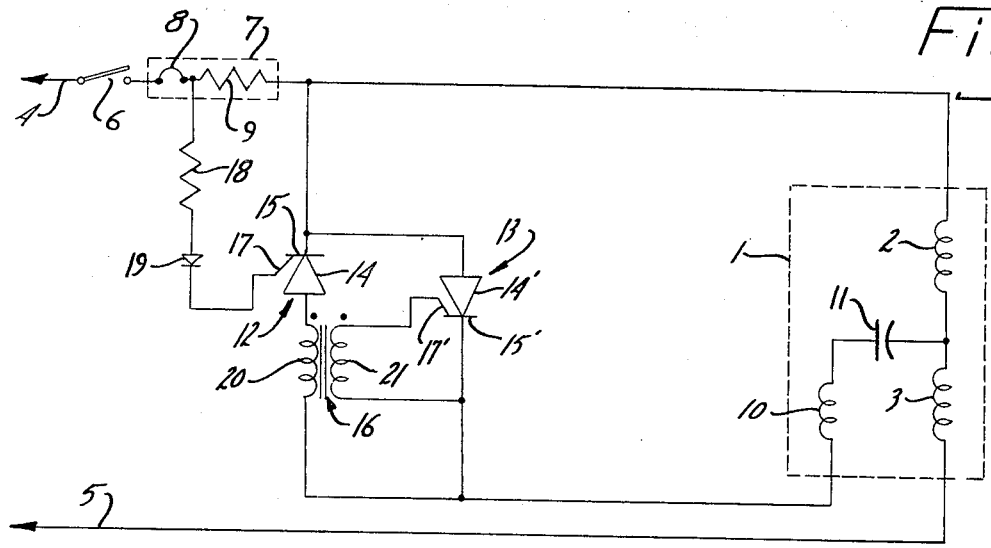
FIG. 1 is a schematic circuit diagram of a single phase motor employing the improved switching circuit of the present invention.

Referring to the drawing and particularly to FIG. 1, a capacitor start induction motor 1 is schematically illustrated including a pair of main run windings 2 and 3 connected in series with each other to a set of incoming power lines 4 and 5 through a manually actuated on-off switch 6. A current responsive motor protector device 7 commercially available under the trademark "Klixon" includes a circuit breaker 8 and a resistance element 9 connected in series in the one power line 4 between the on-off switch 6 and is provided which is wound in a known manner in spaced relation to the main windings 2 and 3 and connected in parallel to the power lines 4 and 5. The start winding 10 is connected in a series branch with a capacitor 11 and a pair of inversely paralleled silicon controlled rectifiers 12 and 13 across the one run winding 2.

Silicon controlled rectifiers 12 and 13 may be the well known type and rectifier 12 is briefly described with corresponding elements of rectifier 13 identified by corresponding primed numbers.

Rectifier 12 includes an anode 14 and cathode 15 connected in series in the start winding branch. The cathode 15 is connected to the winding side of the protector device 7 and the anode 14 is connected to the one side of winding 10 in series with a transformer 16. The gate 17 is connected in series with a current limiting resistor 18 and a diode 19 directly across the resistance element 9 of the "Klixon" motor protector device 7.

The rectifier 13 is connected in parallel with the first rectifier 12 and the transformer 16 and with opposite polarity.

The transformer 16 includes a primary winding 20 connected in series with the anode 14 of the controlled rectifier 12 and the start winding 10. A secondary winding 21 of the transformer 16 is connected across the gate 17' to cathode 15' of the controlled rectifier 13.

The operation of the illustrated embodiment of the invention can be briefly summarized as follows. When the main on-off switch 6 is closed, full line voltage is applied directly across the parallel run winding branch and start winding branch. As a result of the well known impedance characteristics of the windings at standstill, there is a relatively heavy initial surge of current many times greater than that of the normal run current. The voltage drop appearing across the resistance elements 9 of the "Klixon" protective device is of a sufficient magnitude and of the proper polarity to provide a trigger signal to the silicon controlled rectifier 12 to fire the rectifier 12 and establish conduction through the one half cycle of the alternating current input.

The cathode 15 of the first rectifier is connected to the motor side of the "Klixon" protective device and that the gate 17 is connected to the line side of the resistance element 9 thereof. With this condition established, the resistance element carries the out of phase run winding current and the capacitive current of the start winding. The resultant current is in phase with the line voltage and provides the desired firing action.

The controlled rectifier 12 is forward biased when a positive gate signal is applied to gate 17 and the second controlled rectifier 13 is reverse biased to establish corresponding current flow through the auxiliary start winding 10 and capacitor 11.

During the opposite half cycle, the rectifier 12 turns off. The collapsing field of the transformer 20 induces a turn-on voltage to the gate 17' of silicon controlled rectifier 13 which then conducts the alternate or second half cycle of the input current in series with the start winding 10 and the capacitor 11. The controlled rectifier 12 thus continuously conducts current in the first half cycle and the controlled rectifier 13 conducts the current in the half cycle.

It has been found that the very small resistance element 9 of a "Klixon" device is completely satisfactory for providing the necessary firing voltage to the rectifier 12 for starting of the motor 1. This therefore provides a simple and economical circuit for single phase capacitor start induction motors.

The dual run winding motor shown in FIG. 1 is adapted to the usual 115 or 230 volt connection. The series winding connection shown in FIG. 1 is employed when the 230 volt alternating current input is employed. If a 115 volt alternating current input were employed, the windings 2 and 3 would be connected in parallel as shown in FIG. 2 and presently described.

Under locked rotor conditions, the heavy starting current is maintained and the firing voltage on the silicon controlled rectifiers 12 and 13 would maintain current flow through the start winding and rectifiers 12 and 13. Unless unusually high rated silicon controlled rectifiers 12 and 13 are employed, locked rotor currents would damage and destroy them. To employ rectifiers which could withstand such conditions would be economically prohibitive. In accordance with the embodiment of the present invention as shown in FIGS. 2 and 3, an automatic gate protective circuit is provided to bypass the gate signal in response to overload conditions. The motors schematically shown in FIGS. 1 and 2 are basically similar and consequently elements of FIG. 2 are similarly numbered for purposes of simplicity and clarity of explanation.

Figure 2:
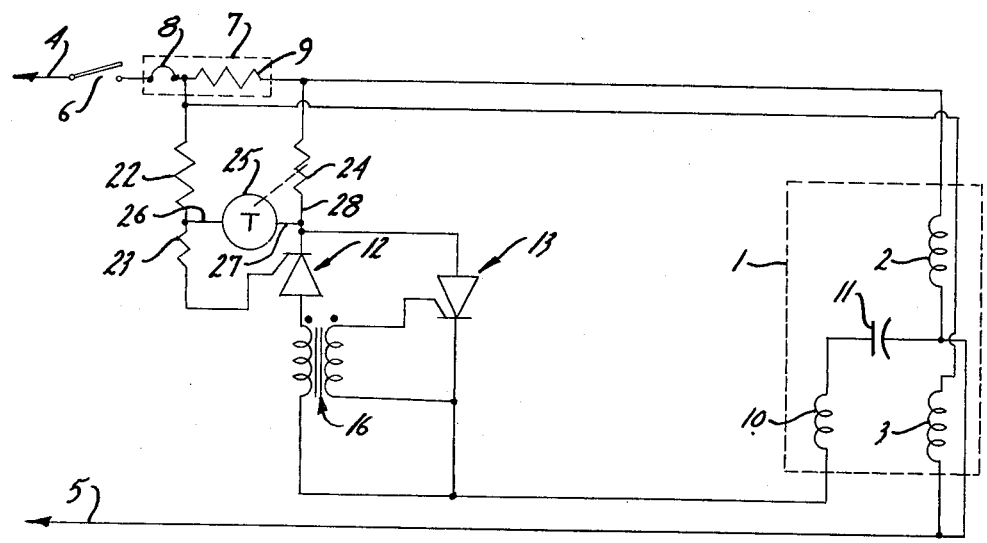
Figure 3:
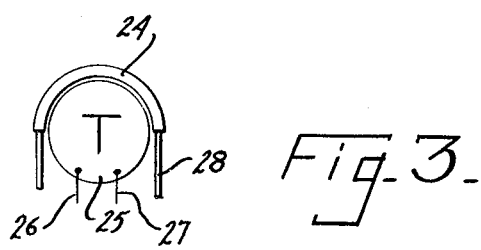
FIG. 3 is a diagrammatic view of the physical arrangement of the protective circuit in accordance with a novel and preferred construction.

Referring particularly to FIG. 2, a dual winding motor 1 is illustrated in usual connection for the 115 volt A.C. input with the start winding 10 similarly connected in series with the capacitor 11 and the inversely connected silicon controlled rectifiers 12 and 13 across the one run winding 2. The run windings 2 and 3 are also paralleled in this connection. The second run winding 3 is connected across the power lines 4 and 5 in series with the protective circuit breaker 8 and thus also in parallel with the run winding 2 in series with the "Klixon" resistance element 9. This is necessary to insure that the "Klixon" resistance element 9 is subjected to similar current connection in either voltage connection.

In the embodiment of FIG. 2, the gate circuit of the controlled rectifier 12 includes a pair of voltage dividing gate resistance elements 22 and 23 connected in series between the junction of the resistance element 9 and the circuit breaker 8 of the "Klixon" motor protector device 7. Further, a resistance element 24 is shown connected in series between the cathode 15 of controlled rectifier 12 and the motor side of the resistance element 9. A thermistor 25 is connected between the junction of the voltage dividing gate resistance elements 22 and 23 and the connection between the protector resistance element 24 to the cathode 15. The thermistor 25 is mounted in heat exchange relation with element 24 and is provided with a negative temperature characteristic and normally has a relatively high resistance. Under normal starting conditions, the surge current through the device 7 exists for a couple of cycles of the input power and the circuit operates essentially in the same manner as the circuit illustrated in FIG. 1. Thus, the heating effect provided by the protective resistance element 24 of the thermistor 25 is insufficient to change its resistance appreciably and change the gate circuit of rectifier 12. However, under locked rotor conditions, the surge current exists for more than the normal period. The heating effect then increases sufficiently to raise the temperature of the thermistor 25 and rapidly drop or decrease its resistance. The low resistance of the thermistor 25 then provides a bypass or short circuit around the gate 17 to cathode 15 of the rectifier 12. The element 24 and the thermistor 25 therefore provide a highly reliable current-time responsive means for protecting the rectifier and permitting use of relatively inexpensive rectifiers.

Applicant has found that this protective circuit is very reliable and permits normal operation of the motor 1 without false triggering while providing extremely reliable and sensitive cutout of the start winding before possible damage to the silicon controlled rectifiers 12 and 13 can occur under locked rotor conditions or the like.

Although the protector resistance element 24 may within the broadest aspect be any desired unit, applicant has found a very simple and inexpensive response unit can be provided as shown in FIG. 3. The thermistor 25 is a small disc-like wafer member having the circuit leads 26 and 27. The connecting lead 28 from the cathode 15 of the controlled rectifier 12 is a standard lead in which a length of resistance wire 28; for example, nichrome wire, is connected and looped closely about the thermistor 25. It has been found that the effect of the current through the wire 28 is a sufficient heat source to provide the desired triggering of the thermistor.

The present invention has thus been found to provide a very simple, reliable and long life motor starting circuit for a capacitor start induction run motor.

Various modes of carrying out the invention are contemplated as being within the scope of the following claims particularly pointing out and distinctly claiming the subject matter which is regarded as the invention.

I claim:

1. In a single phase alternating current capacitor start motor having a run winding branch circuit and a start winding branch circuit connected in parallel with the run winding branch circuit to a set of power lines, said start winding branch circuit including a start winding in series with a capacitor and a triggered solid state switch means having a trigger element means, wherein the improvement comprises the connection of the trigger element means to the power supply lines and includes:

a motor protective device having a resistance element and a circuit breaker means responsive to the current through said resistance element and connected in one of said power lines, and trigger resistance means connected in series with the trigger element means to the power line side of the resistance element of the protective device whereby the voltage drop across the protective device is connected to fire the triggered switch means during one half cycle.

2. The motor of claim 1 wherein the trigger resistance means includes a resistance element and a diode is connected in series between the resistance element and the trigger element means.

3. The motor of claim 1 wherein said switch means includes a pair of inversely connected paralleled silicon controlled rectifiers having gates as separate trigger element means, a first controlled rectifier having its gate connected in series with the trigger resistance means and the second of said controlled rectifiers having its gate coupled to the circuit of the first controlled rectifier.

4. The motor of claim 1 wherein said switch means includes a pair of inversely connected paralleled silicon controlled rectifiers having gates as separate trigger element means, a first controlled rectifier having its gate connected in series with the trigger resistance means and the second of said controlled rectifiers having its gate coupled to the circuit of the first controlled rectifier, and a diode connected between the trigger resistance means and the gate of the first controlled rectifier.

5. In a single phase alternating current capacitor start motor having a run winding branch circuit and a start winding branch circuit connected in parallel with the run winding branch circuit to a set of power lines, said start winding branch circuit including a start winding in series with a capacitor and a triggered solid state switch means having a trigger element means, the improvement in the connection of the trigger element to the power supply lines comprising:

means connected to the power supply lines and to the trigger element means and providing triggering signals for said triggered switch means during the starting of the motor, and current-time responsive means electrically connected in the start winding branch circuit and connected to effectively open the circuit to the trigger element means in response to surge current for a selected time duration.

6. The motor of claim 5 wherein said current-time responsive means includes a temperature responsive element connected to bypass the trigger element means and an electrical heating element coupled to the temperature responsive element and connected in series with the solid state switch means in the start winding branch circuit.

7. The motor of claim 5 wherein said current-time responsive means includes a temperature responsive resistance element connected to bypass the trigger element means and an electrical heating element coupled to the temperature responsive resistance element and connected in series with the solid state switch means in the start winding branch circuit.

8. The motor of claim 5 wherein voltage dividing resistance means are connected in series with trigger element means, and said current-time responsive means includes resistance means connected in series in the start winding branch circuit and providing a heat source, and a thermistor having a negative temperature characteristic connected between the voltage dividing resistance means and the solid state switch means, said thermistor being selected to permit normal starting of the motor and to bypass the trigger element means in response to a locked rotor condition of the motor.

References Cited
UNITED STATES PATENTS

| | | | |
|---|---|---|---|
| 2,117,123 | 5/1938 | Werner | 318—221 XR |
| 2,871,376 | 1/1959 | Kretzmer | 307—310 |
| 3,071,717 | 1/1963 | Gordon | 318—221 |
| 3,116,445 | 12/1963 | Wright | 318—220 |
| 3,211,989 | 10/1965 | Mintz et al. | 307—310 XR |
| 3,226,620 | 12/1965 | Elliott et al. | 318—221 |

ORIS L. RADER, Primary Examiner

G. Z. RUBINSON, Assistant Examiner

U.S. Cl. X.R.
318—202, 227, 252, 310